US011324041B2

(12) United States Patent
Zhou et al.

(10) Patent No.: US 11,324,041 B2
(45) Date of Patent: May 3, 2022

(54) SIGNALING OF DEFAULT AND SCHEDULED BEAM IN COT

(71) Applicant: QUALCOMM Incorporated, San Diego, CA (US)

(72) Inventors: Yan Zhou, San Diego, CA (US); Tao Luo, San Diego, CA (US); Srinivas Yerramalli, San Diego, CA (US); Arumugam Chendamarai Kannan, San Diego, CA (US); Makesh Pravin John Wilson, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/654,542

(22) Filed: Oct. 16, 2019

(65) Prior Publication Data

US 2020/0196351 A1 Jun. 18, 2020

Related U.S. Application Data

(60) Provisional application No. 62/780,155, filed on Dec. 14, 2018.

(51) Int. Cl.
*H04W 74/08* (2009.01)
*H04W 72/04* (2009.01)
(Continued)

(52) U.S. Cl.
CPC ..... *H04W 74/0808* (2013.01); *H04W 72/042* (2013.01); *H04W 72/046* (2013.01);
(Continued)

(58) Field of Classification Search
None
See application file for complete search history.

(56) References Cited

U.S. PATENT DOCUMENTS 10,841,914 B2 * 11/2020 Liou ................ H04W 72/042
11,083,018 B2 * 8/2021 Xu .................... H04W 48/16
(Continued)

FOREIGN PATENT DOCUMENTS

WO 2018182934 A1 10/2018
WO 2018217063 A1 11/2018

OTHER PUBLICATIONS

International Search Report and Written Opinion—PCT/US2019/056792—ISA/EPO—Jan. 28, 2020.

*Primary Examiner* — Anh Vu H Ly
(74) *Attorney, Agent, or Firm* — Procopio, Cory, Hargreaves & Savitch LLP

(57) ABSTRACT

Improved signaling of default and scheduled beams in a Channel Occupancy Time (COT) are provided through a base station that indicates a default or scheduled reception (Rx) or transmission (Tx) beam to a UE for use in the COT. As a result, the base station allows the UE to identify its default or scheduled Rx or Tx beam for its scheduled data at earliest at the beginning of the COT, without having to derive the beam from the QCL of the lowest CORESET ID in a dynamically indicated DCI of the latest monitored slot. The UE can thus more rapidly realize the default or scheduled Rx and/or Tx beam in high unlicensed bands (e.g. 60 GHz) and subsequently communicate with the base station in one or more COTs or a portion of a COT using the default or scheduled Rx or Tx beam.

18 Claims, 13 Drawing Sheets

(51) Int. Cl.
*H04W 76/27* (2018.01)
*H04W 80/02* (2009.01)
*H04W 72/12* (2009.01)

(52) U.S. Cl.
CPC ....... *H04W 72/1273* (2013.01); *H04W 76/27* (2018.02); *H04W 80/02* (2013.01)

(56) References Cited

U.S. PATENT DOCUMENTS

| | | |
|---|---|---|
| 2017/0231011 A1* | 8/2017 | Park .................... H04W 74/006 |
| 2019/0289588 A1* | 9/2019 | Akkarakaran ......... H04B 7/088 |
| 2019/0297603 A1* | 9/2019 | Guo ...................... H04L 5/0051 |
| 2019/0306924 A1* | 10/2019 | Zhang .................. H04B 7/0695 |
| 2019/0349059 A1* | 11/2019 | John Wilson ..... H04W 72/0453 |
| 2019/0373635 A1* | 12/2019 | Yang .................... H04B 7/0408 |
| 2020/0037354 A1* | 1/2020 | Li ...................... H04W 74/0808 |
| 2020/0119869 A1* | 4/2020 | Taherzadeh Boroujeni ................ H04L 5/0094 |
| 2020/0145079 A1* | 5/2020 | Marinier .............. H04B 7/0456 |
| 2020/0195334 A1* | 6/2020 | Zhou .................... H04L 5/005 |
| 2020/0196277 A1* | 6/2020 | Zhou ........................ H04L 5/001 |
| 2020/0196336 A1* | 6/2020 | Zhou ................ H04W 72/1273 |
| 2020/0288479 A1* | 9/2020 | Xi ............................ H04B 7/02 |
| 2020/0314906 A1* | 10/2020 | Goyal ................. H04B 7/0695 |
| 2020/0322932 A1* | 10/2020 | Kim .................... H04B 7/0695 |

* cited by examiner

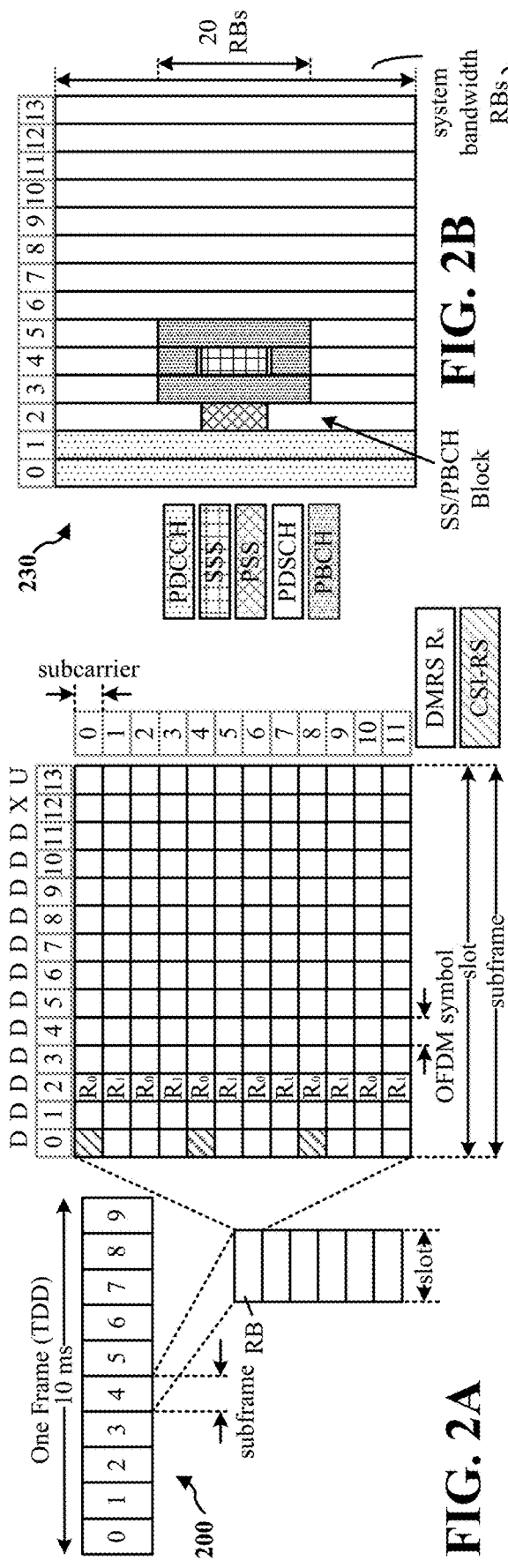
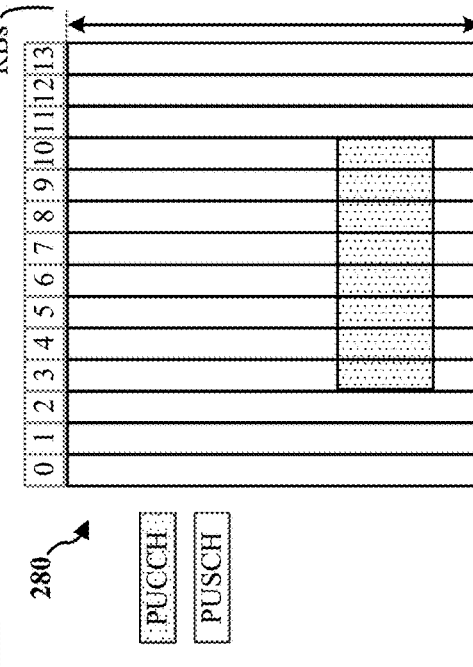
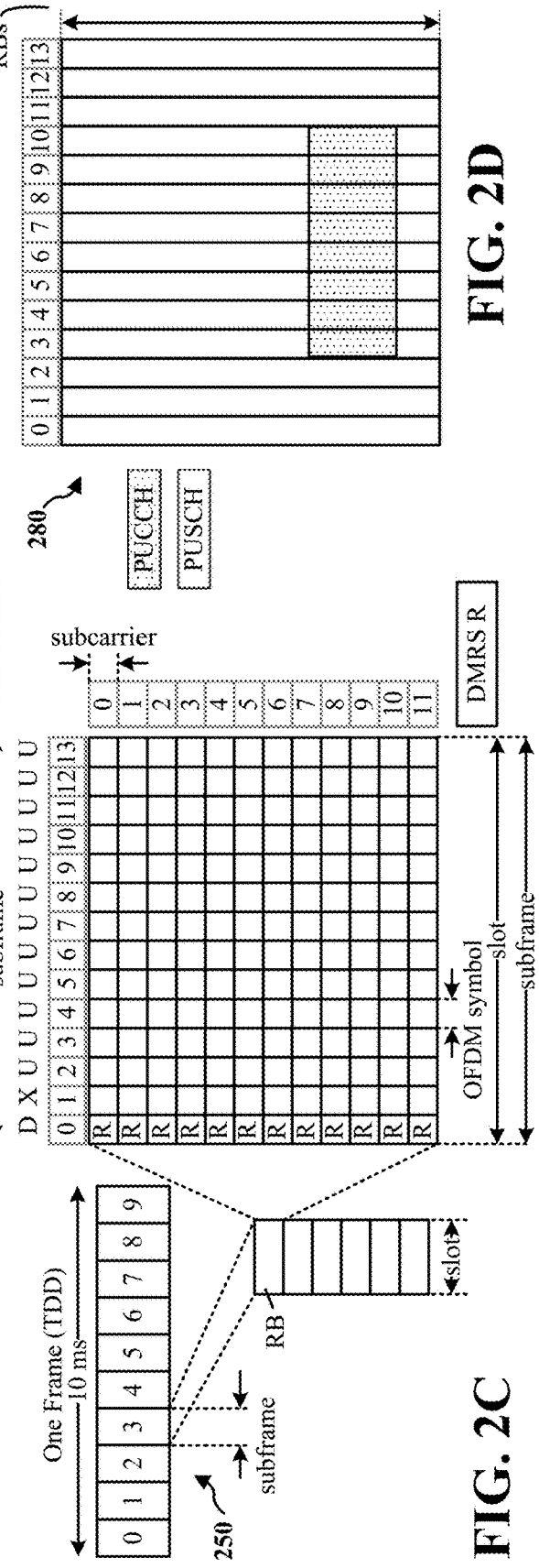
FIG. 2A  FIG. 2B  FIG. 2C  FIG. 2D

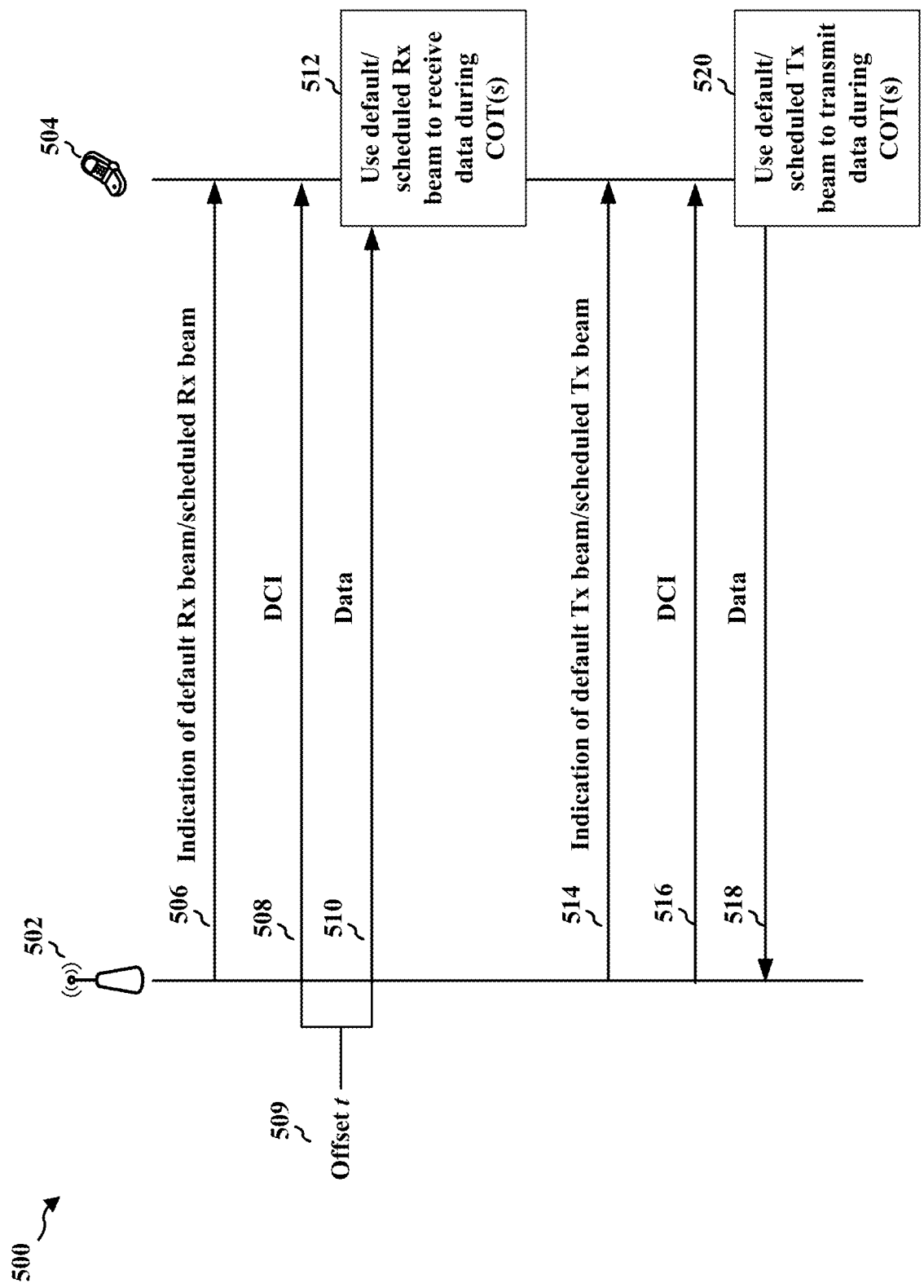

US 11,324,041 B2

SIGNALING OF DEFAULT AND SCHEDULED BEAM IN COT

CROSS REFERENCE TO RELATED APPLICATION(S)

This application claims the benefit of U.S. Provisional Application Ser. No. 62/780,155, entitled "SIGNALING OF DEFAULT AND SCHEDULED BEAM IN COT" and filed on Dec. 14, 2018, which is expressly incorporated by reference herein in its entirety.

BACKGROUND

Technical Field

The present disclosure relates generally to communication systems, and more particularly, to beam indication in wireless communications between a base station and a UE.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-CDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In licensed communication bands, a default UE reception (Rx) beam is quasi-colocated (QCL) with a lowest Control Resource Set Identifier (CORESET ID) in the latest monitored slot. However, communication in unlicensed frequency bands may be different. For example, New Radio Unlicensed (NR-U) focuses on higher, unlicensed frequency bands (e.g. 60 GHz), and data can only be transmitted within a Channel Occupancy Time (COT). The shared nature of the medium may lead to differences in beams used for communication. If a UE needs to wait to receive and decode downlink control information (DCI) in a scheduling grant in order to identify the Rx beam, the COT may expire before the UE can fully identify the beam to receive the data. Hence, there is a need for an improved way for a UE to determine default and/or scheduled beams, e.g., for communication using unlicensed bands.

The present disclosure addresses this problem by providing for improved signaling of default and/or scheduled beams for use in a COT. In one aspect, the base station directly indicates a default or scheduled reception (Rx) or transmission (Tx) beam in in a Control Resource Set (CORESET) at the beginning of the COT. As a result, the base station allows the UE to identify a default and/or scheduled beam for reception and/or transmission of data in an efficient manner for use in a COT. The UE can thus more rapidly determine the default and/or scheduled beam and subsequently communicate with the base station in one or more COTs (or a portion of a COT) using the default or scheduled beam.

In an aspect of the disclosure, a method, a computer-readable medium, and an apparatus are provided of wireless communication at a User Equipment (UE). The UE receives, from a base station, an indication of at least one of a default beam or a scheduled beam for use in at least one COT. Then, the UE communicates with the base station in the at least one COT using the default beam or the scheduled beam.

In another aspect of the disclosure, a method, a computer-readable medium, and an apparatus are provided of wireless communication at a base station. The base station indicates to the UE at least one of a default beam or a scheduled beam for use in at least one COT. The base station then communicates with the UE in the at least one COT based on the default beam or the scheduled beam.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 is a call flow diagram between a base station and a UE.

DETAILED DESCRIPTION

Figure 1:
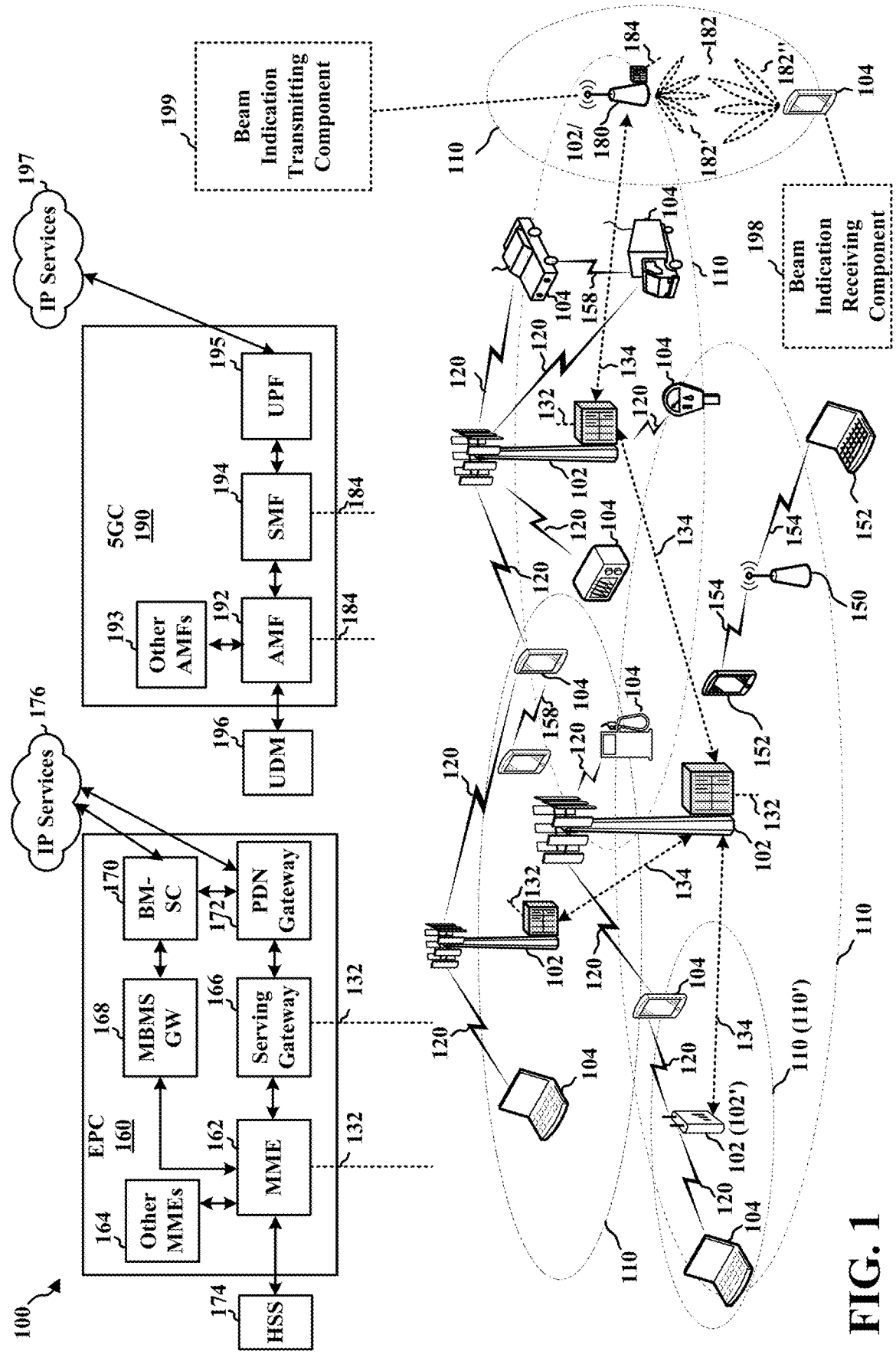
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a beam indication receiving component 198 configured to receive, from a base station, an indication of at least one of a default beam or a scheduled beam for use in at least one COT and to communicate with the base station in the at least one COT using the default beam or the scheduled beam. In other aspects, the base station 102/180 may include a beam indication transmitting component 199 configured to indicate, to a UE, at least one of a default beam or a scheduled beam for use in at least one COT and to communicate with the UE in the at least one COT based on the default beam or the scheduled beam. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
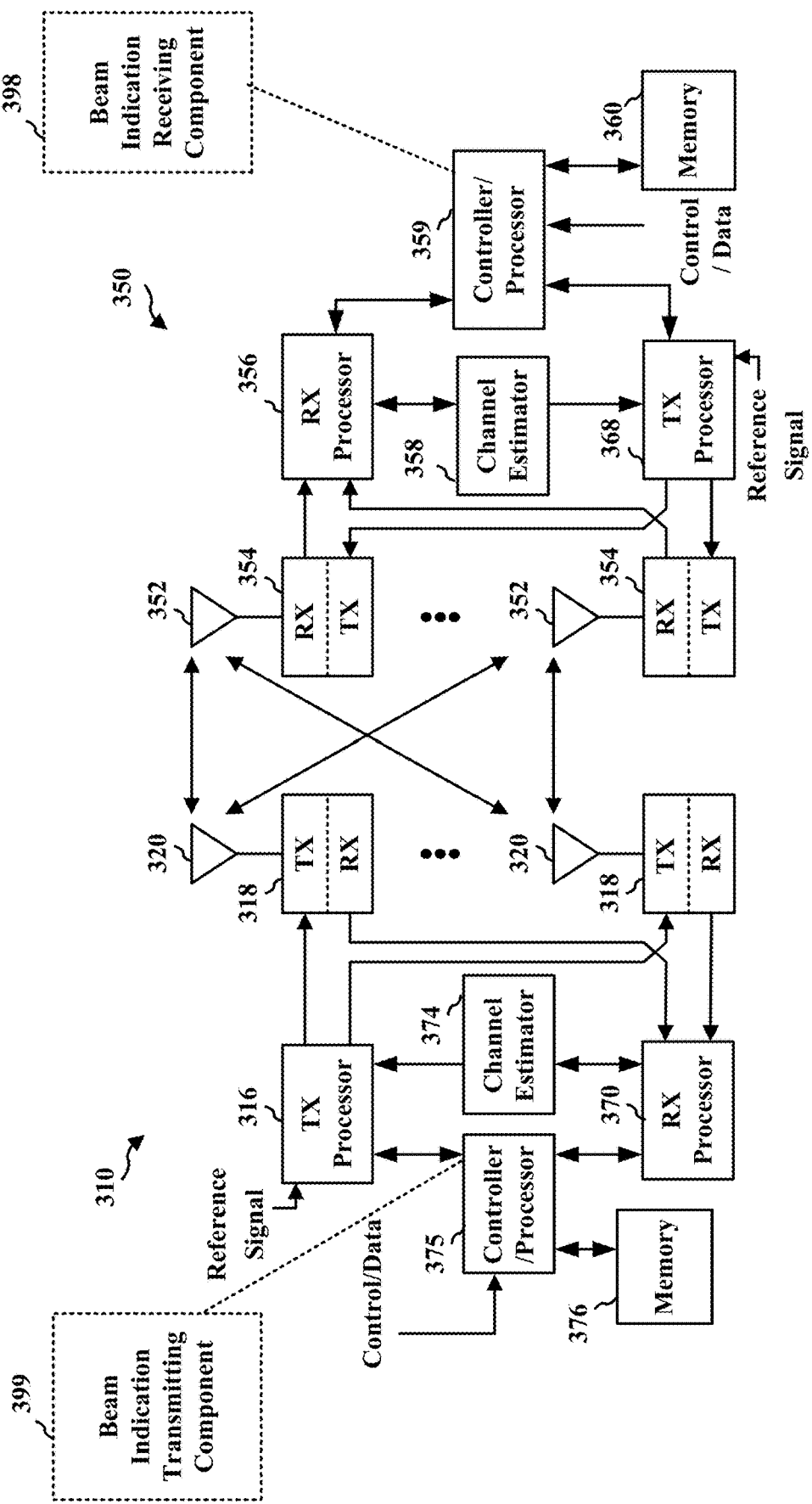
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In certain aspects, the controller/processor 359 of UE 350 may include an beam indication receiving component 398 configured to receive, from base station 310, an indication of at least one of a default beam or a scheduled beam for use in at least one Channel Occupancy Time (COT); and to communicate with the base station in the at least one COT using the default beam or the scheduled beam. In other aspects, the controller/processor 375 of base station 310 may include a beam indication transmitting component 399 configured to indicate, to UE 350, at least one of a default beam or a scheduled beam for use in at least one Channel Occupancy Time (COT); and to communicate with the UE in the at least one COT based on the default beam or the scheduled beam.

At least one of the TX processor 368, the RX processor 356, and the controller/processor 359 may be configured to perform aspects in connection with beam indication receiving component 198, 398 of FIGS. 1 and 3.

At least one of the TX processor 316, the RX processor 370, and the controller/processor 375 may be configured to perform aspects in connection with beam indication transmitting component 199, 399 of FIGS. 1 and 3.

Figure 4A:
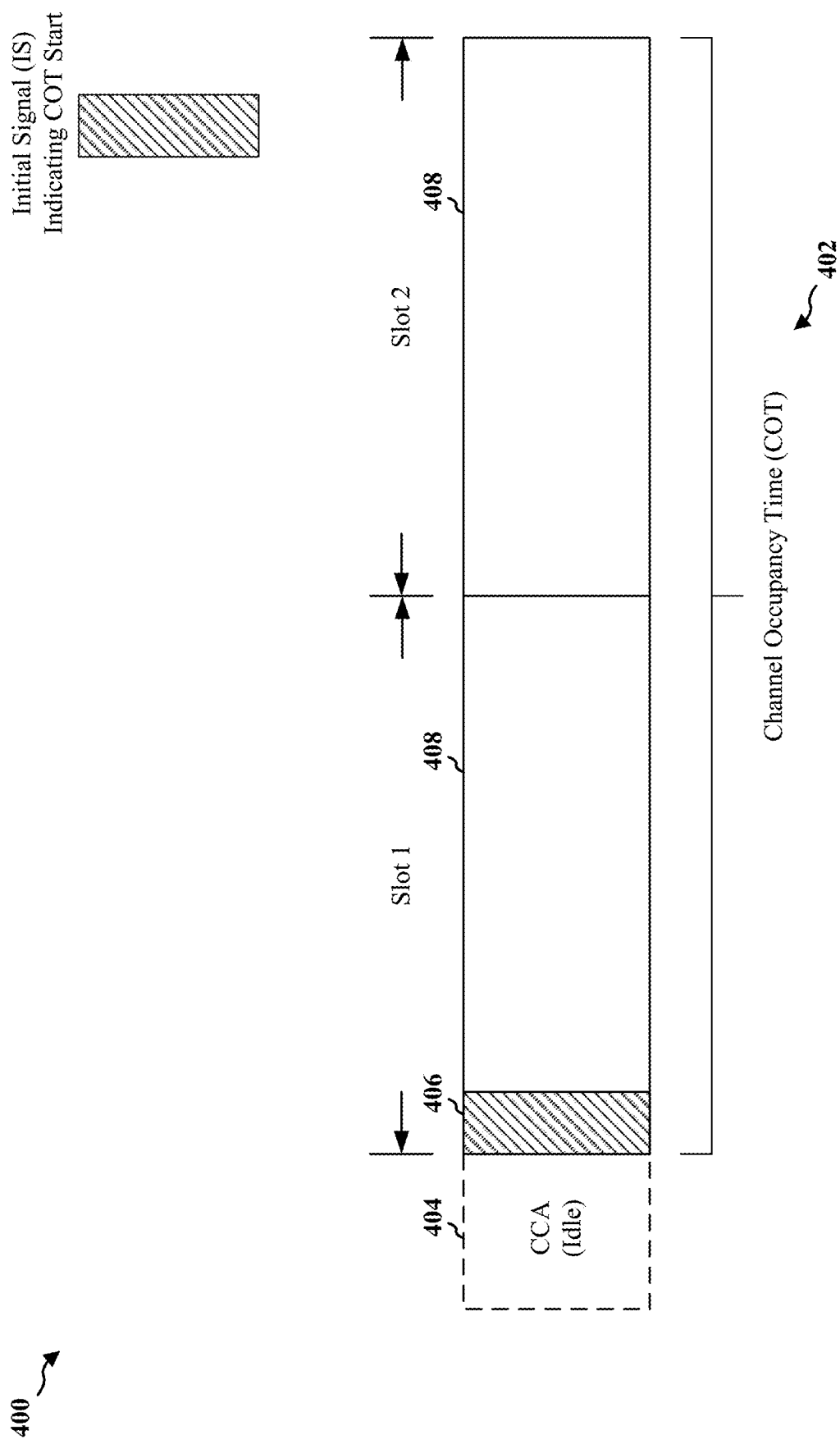
FIG. 4A is a diagram illustrating a channel occupancy time (COT) of a base station.

FIG. 4A depicts a diagram 400 illustrating an example channel occupancy time (COT) 402 for a base station, e.g., for transmitting and/or receiving communication using an unlicensed frequency band. In unlicensed bands where the transmission medium is generally shared among multiple devices (e.g. 60 GHz), the base station first performs a clear channel assessment (CCA), e.g., at 404, to determine if the medium is available for use by the base station. If the CCA clears (i.e. the base station is successful in its contention for the medium), the base station is able to use the channel for the duration of a COT 402 to schedule grants and transmit/receive data to one or more UEs. The base station informs the UE that it controls the medium by transmitting an initial signal (IS) 406 at the beginning of the COT, discussed infra. While the COT 402 in FIG. 4A is illustrated as spanning two slots, two slots is merely one example of a COT duration. The COT may span any number of slots 408. The IS 406 may provide an indication to the UE informing the UE to monitor for further communication from the base station during the COT.

Figure 4B:
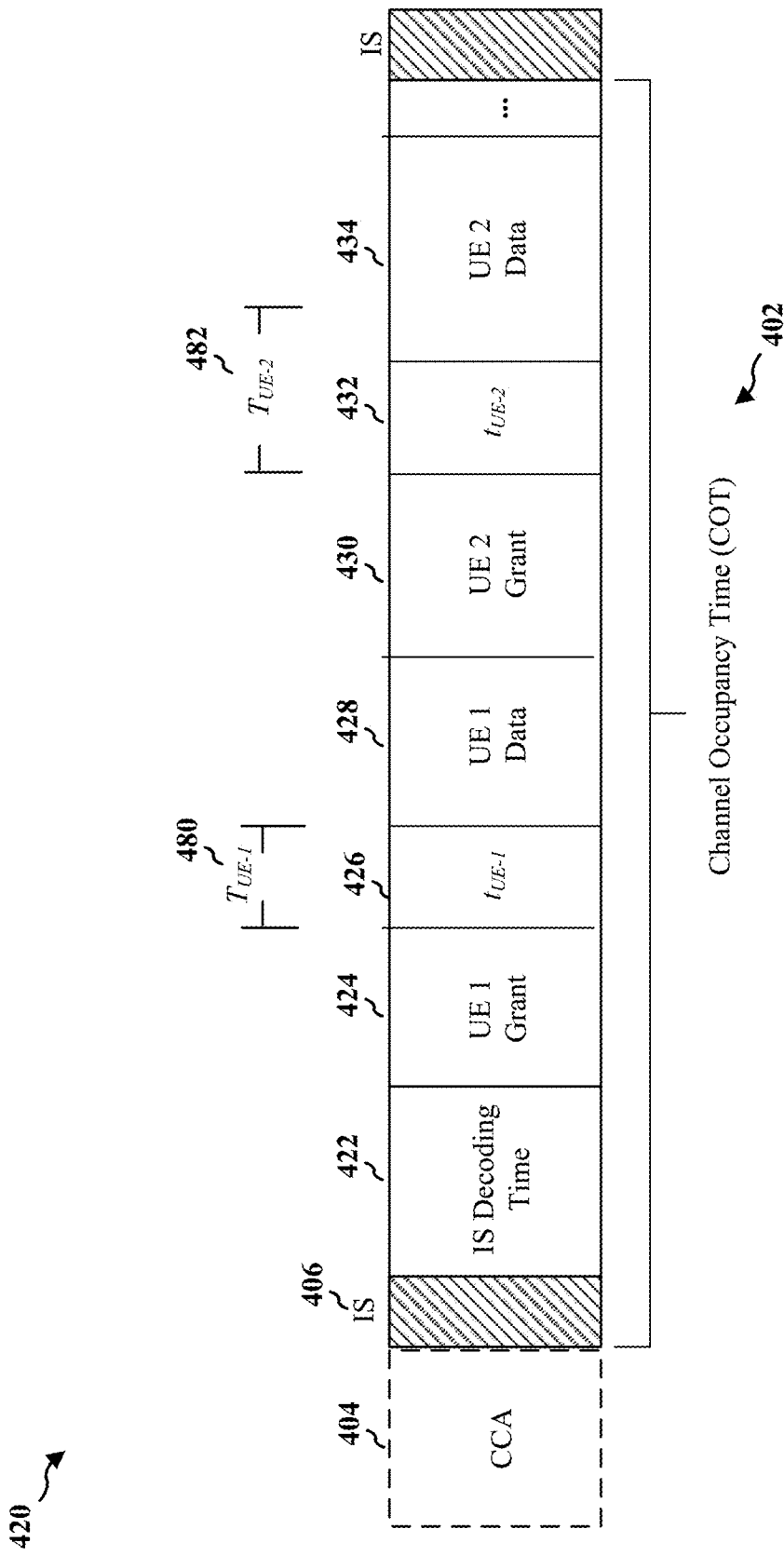
FIG. 4B is a diagram illustrating a base station's transmissions to a UE during a COT.

FIG. 4B illustrates an example block diagram 420 depicting a base station's transmissions to a UE during the COT 402. Once the base station successfully performs a CCA 404, the base station transmits an IS 406 at the beginning of the COT. The IS 406 informs the UE that the base station has acquired the channel and is able to transmit a grant and/or data to the UE. In one aspect, the IS 406 may include Group Common Physical Downlink Control Channel (GC-PDCCH) information or a reference signal (e.g. a Channel State Information Reference Signal (CSI-RS)). In another aspect, the IS 406 may include control information such as a control resource set (CORESET). The UE decodes the received IS over a decoding period 422, after which the UE knows to monitor the channel for communications from the base station. During the decoding period 422, the UE does not monitor for communication from the base station. Following the decoding period 422, the UE may receive a grant for a DL data transmission, receive a grant for an UL data transmission, receive DL data, and/or transmit UL data. For example, the UE may then receive a scheduling grant 424 containing downlink control information (DCI) for DL/UL communication. The corresponding data 428 may be communicated at 426. There may be an offset 426 between the grant and the corresponding transmission/reception of data 428. The base station may communicate with a single UE in the COT or may communicate with multiple UEs during the COT. In an example involving communication with multiple UEs, the base station may send UE-specific grants and data during the COT. For example, FIG. 4B illustrates UE-1 receiving its own scheduling grant 424 followed after an offset 426 by its corresponding data 428 (either DL or UL data), and UE-2 receiving its own scheduling grant 430 followed after an offset 432 by its corresponding data 434.

In order to receive the communication from the base station, the UE may need to determine a reception beam from among a plurality of potential reception beams. While a UE communicating in the licensed band may simply follow a relationship in which a default reception beam is QCL with a lowest CORESET ID from a latest monitored slot, this relationship may lead to problems when applied in communication in the unlicensed frequency spectrum.

Figure 4C:
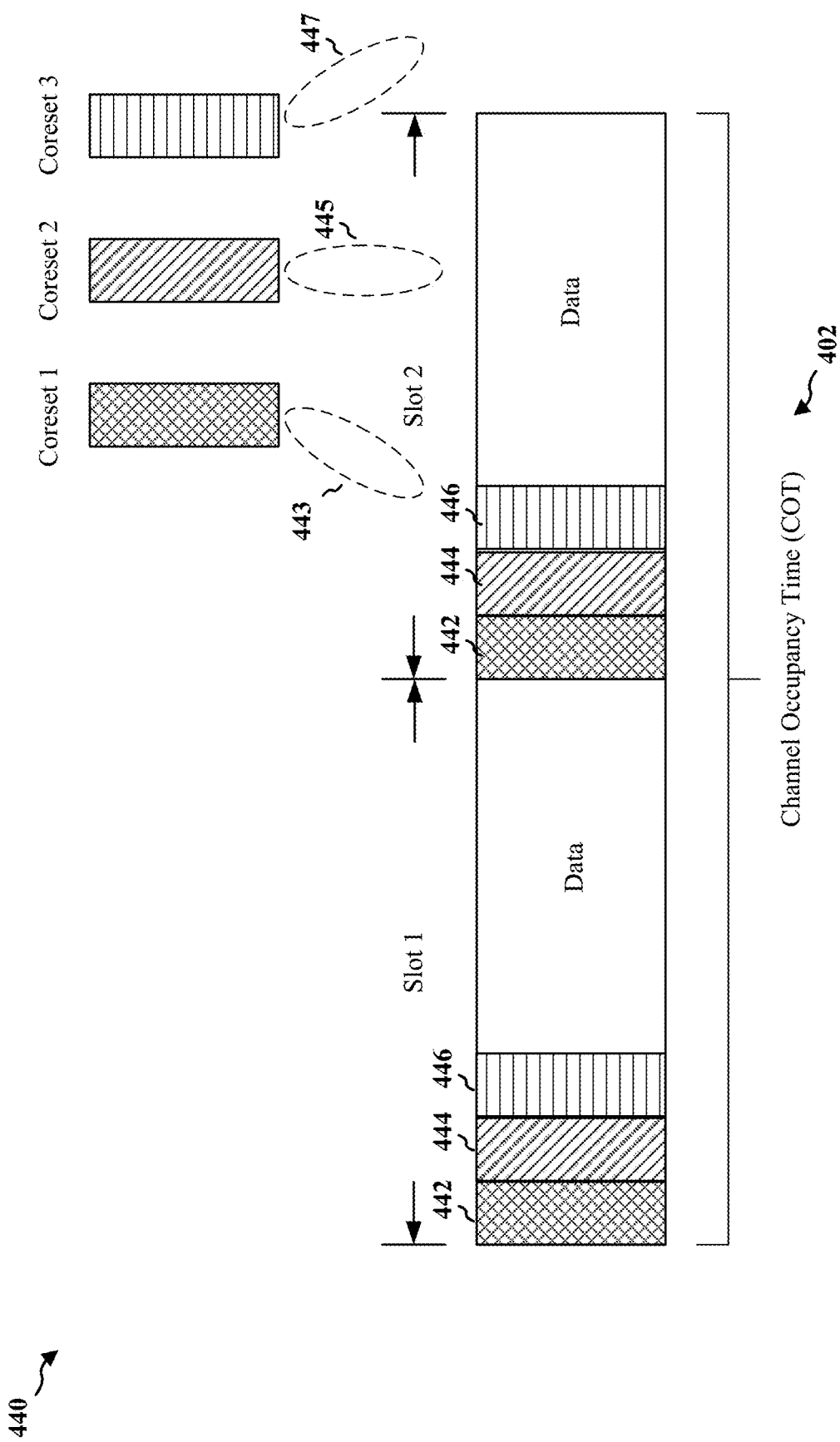
FIG. 4C is a diagram illustrating a base station's transmission of one or more CORESETs to the UE during a COT.

FIG. 4C illustrates an example block diagram 440 depicting CORESETs IDs 442, 444, 446 associated with resources within a slot. Each CORESET may indicate where the UE may receive PDCCH transmissions and may include reference signals (e.g. Synchronization Signal Block (SSB), CSI-RS, etc.) corresponding to a particular spatial filter or beam. For example, CORESET 1 442 may be associated with a beam 443 having a first direction, CORESET 2 444 may be associated with a beam 445 having a second direction, and CORESET 3 446 may be associated with a beam 447 having a third direction. Each CORESET may also include a transmission configuration indication (TCI) state which provides information about the antenna ports with which the PDCCH antenna ports are quasi co-located. The UE may receive one or more CORESETs from the base station at the beginning of any slot.

In licensed communication bands, the default UE reception (Rx) beam follows the QCL corresponding to the lowest CORESET ID in the latest monitored slot. For example, referring to FIG. 4C, if Slot 2 was the latest slot and CORESET 1 had the lowest CORESET ID, then assuming spatial quasi-location between PDCCH and PDSCH antenna ports, the default Rx beam which the UE would use to receive data on PDSCH in Slot 2 would be the same as that associated with CORESET 1, e.g., beam 443.

However, in the unlicensed band, the base station NR-U, which focuses on higher, unlicensed frequency bands (e.g. 60 GHz), data can only be transmitted within each COT due to the shared nature of the medium. The UE also generally has to wait to receive and decode a DCI in the scheduling grant to identify the Rx beam. Therefore, the COT may expire before the UE can fully realize the beam to receive the data. For example, if the data were to be too large for the two-slot COT of FIGS. 4A and 4C, the UE may more likely have to again undergo beam adjustment to continue receiving data during the next COT than in licensed bands without COT. Hence, there is a need for improved signaling of default and scheduled beams for unlicensed bands with COTs.

In order to solve this problem, a base station may indicate a default and/or scheduled beam, e.g., a Rx beam or a Tx beam, for use in the COT.

FIG. 5 illustrates a call flow diagram 500 between a base station 502 and a UE 504 where the base station directly indicates a default or scheduled UE beam in the COT according to the improved signaling of the present disclosure. In one aspect, the indicated default or scheduled UE beam may be a reception (Rx) beam by which the UE receives downlink communications from the base station. In another aspect, the indicated default or scheduled beam may be a transmission (Tx) beam by which the UE transmits uplink communications to the base station.

In one example, the base station may transmit an indication 506 of the default or scheduled reception (Rx) beam in a CORESET at the beginning of the COT. For example, referring to FIGS. 4B and 4C, the base station may indicate the Rx beam in CORESET-1 442, CORESET-2 444, or CORESET-3 446 during Slot 1 of the COT 402. The default Rx beam or scheduled Rx beam may correspond to any of these CORESETs (e.g. beams 443, 445, or 447) or may have a relationship based on any of the CORESETs. As a result, the base station allows the UE to identify its default or scheduled reception beam for its scheduled data at earliest at the beginning of the COT (e.g. Slot 1), without having to derive the beam from the QCL of the lowest CORESET ID in a dynamically indicated DCI of the latest monitored slot (e.g. Slot 2).

In one aspect, the base station may indicate the default or scheduled Rx beam based on a TCI state for the Rx beam. For example, the base station may transmit a CORESET including a TCI state indicating that the data transmission will be made using the same beam as the reference signal associated with the TCI. In another aspect, the base station may indicate the default or scheduled Rx beam using a spatial QCL assumption. For example, the base station may indicate for the UE to assume that the antenna port transmitting a particular signal is QCL with an antenna port for the Rx beam. As one example, the base station may indicate that the SSB is spatially QCL with an antenna port transmitting a DM-RS in the PDSCH, and therefore that the data transmission will be made using the same beam as that used for the SSB.

The base station may transmit control information, including DCI 508 to the UE, followed after an offset t 509 by the scheduled data 510 for that UE. Depending on whether the offset between the DCI 508 and scheduled data 510 is less than a threshold T, the UE may use 512 either the default or scheduled Rx beam to receive the data. This threshold T may be based on the UE's capability in time to receive and decode the grant and identify and switch to the Rx beam, while the offset t 510 represents the time gap between the transmission of a grant and its associated data. For example, referring to FIG. 4B, the base station may provide an amount of time $t_{UE-1}$ (i.e. a first offset 426) for UE-1 to receive the DCI in its grant 424 and switch to its scheduled Rx beam prior to receiving its scheduled data 428, and the base station may provide a same or different amount of time $t_{UE-2}$ (i.e. a second offset 432) for UE-2 to receive the DCI in its grant 430 and switch to its scheduled Rx beam prior to receiving its scheduled data 434.

If the amount of time t (the offset 509) for the UE to receive and decode the grant/PDCCH is less than the threshold T for that UE (i.e. the UE cannot decode the grant and switch to a scheduled Rx beam in time prior to receiving the data), the UE applies the default Rx beam. Alternatively, if the amount of time t (the offset 509) for the UE to receive and decode the grant/PDCCH is greater than or equal to the threshold T for that UE (i.e. the UE can decode the grant and switch to a scheduled Rx beam in time prior to receiving the data), the UE applies the scheduled Rx beam. Thus, in the example of FIG. 4B, the offset $t_{UE-2}$ 432 between UE-2's grant 430 and scheduled data 434 is less than UE-2's threshold $T_{UE-2}$ 482, and therefore UE-2 cannot switch to a scheduled Rx beam prior to receiving its scheduled data. Accordingly, UE-2 will apply a default Rx beam (e.g. beam 443) to receive its scheduled data. However, the offset $t_{UE-1}$ 426 between UE-1's grant 424 and data 428 is greater than UE-1's threshold $T_{UE-1}$ 480, and therefore UE-1 can switch to a scheduled Rx beam prior to receiving its scheduled data. Accordingly, UE-1 will apply a scheduled Rx beam (e.g. beam 445) to receive its scheduled data.

In one aspect, the base station may indicate a common scheduled Rx beam for all CORESETs. For example, in the example of FIGS. 4B and 4C, irrespective of whether CORESET-1 442, CORESET-2 444, or CORESET-3 446 defines the grant 424 which schedules data 428, UE-1 can use a common, scheduled Rx beam (e.g. beam 447) to receive data scheduled from any of those CORESETs. In another aspect, the base station may indicate a scheduled Rx beam for each individual CORESET that can be used to receive data scheduled from that CORESET. For example, in the example of FIGS. 4B and 4C, UE-1 can decode a TCI state of CORESET-2 444 for an indicated scheduled Rx beam (e.g. beam 445), which the UE can use to receive data scheduled by CORESET-2 444.

In an additional aspect, the indicated default or scheduled Rx beam can be applied to a single COT, to multiple COTs, or to part of a COT (e.g. certain slots of a COT). The base station may also signal an associated time schedule for the default or scheduled Rx beam. For example, referring to FIGS. 4B and 4C, the base station can inform UE-1 to apply its indicated scheduled beam identified from CORESET-2 444 for Slot 1 only, for the entire COT 402, or for multiple COTs.

Similarly, the base station may transmit an indication 514 of the default or scheduled transmission (Tx) beam for the UE to use in transmitting communication to the base station during the COT. For example, referring to FIGS. 4B and 4C, the base station may indicate the Tx beam using a relationship to another signal, e.g., to a CORESET-1 442, CORESET-2 444, or CORESET-3 446 used to schedule the UL transmission. As a result, the base station allows the UE to identify its transmission beam for uplink communication at earliest at the beginning of the COT (e.g. Slot 1).

In one aspect, the base station may indicate the default or scheduled Tx beam by spatial relation to another signal. For example, the base station may indicate in a CORESET for the UE to transmit data on PUSCH with the same Tx beam as that dedicated to a scheduled PUCCH resource based on a spatial relation between the PUSCH and PUCCH antenna ports. In another aspect, the base station may indicate the default or scheduled Rx beam using downlink/uplink correspondence. For example, the base station may indicate for the UE to transmit SRS using the same spatial filter used to receive a downlink reference signal such as SSB or CSI-RS.

The base station transmits control information including downlink control information (DCI) 516 to the UE, which identifies the uplink resources for the UE to use when transmitting data 518 to the base station. Depending on whether the DCI contains an UL beam indication, the UE may use 520 either the default or scheduled Tx beam to transmit the data. If the scheduling information does not contain an UL beam indication, the UE may apply the default Tx beam. Alternatively, if the scheduling information contains an UL beam indication, the UE may apply the scheduled Tx beam. For example, in FIG. 4B, the base station may schedule an UL signal for UE-2 in grant 430 using DCI format 0-0. As DCI format 0-0 may not include a SRS Resource Indicator (SRI) field, UE-2 may not know which UL beam to use for its scheduled data transmission. Accordingly, since the DCI for UE-2 does not include an UL beam indication, UE-2 may apply a default Tx beam (e.g. beam 443) for its uplink data transmission.

In one aspect, the base station may indicate a common scheduled Tx beam for all CORESETs. For example, if the scheduling information does not include an uplink beam indication informing the UE which UL beam to use, the base station can indicate a common scheduled Tx beam for the UE to use for UL transmission that is configured for all CORESETs. Thus, in the example of FIGS. 4B and 4C, since the grant 430 for UE-2 did not include an UL beam indication, the base station can indicate a common scheduled Tx beam (e.g. beam 447) for UE-2 to use based on an UL grant received in any of CORESET-1 442, CORESET-2 444, or CORESET-3 446. In another aspect, the base station may indicate a scheduled Tx beam per individual CORESET that can be used to transmit data scheduled from that CORESET. For example, in the example of FIG. 4C, if CORESET-1 442 schedules data for UE-1, the UE-1 can use the indicated scheduled Tx beam to transmit data scheduled by CORESET-1 442.

In an additional aspect, the indicated default or scheduled Tx beam can be applied to a single COT, to multiple COTs, or to part of a COT (e.g. certain slots of a COT). The base station may also signal an associated time schedule for the default or scheduled Tx beam. For example, referring to FIGS. 4B and 4C, the base station can inform UE-1 to apply its indicated scheduled beam identified from CORESET-1 442 for Slot 1 only, for the entire COT, or for multiple COTs.

Figure 6:
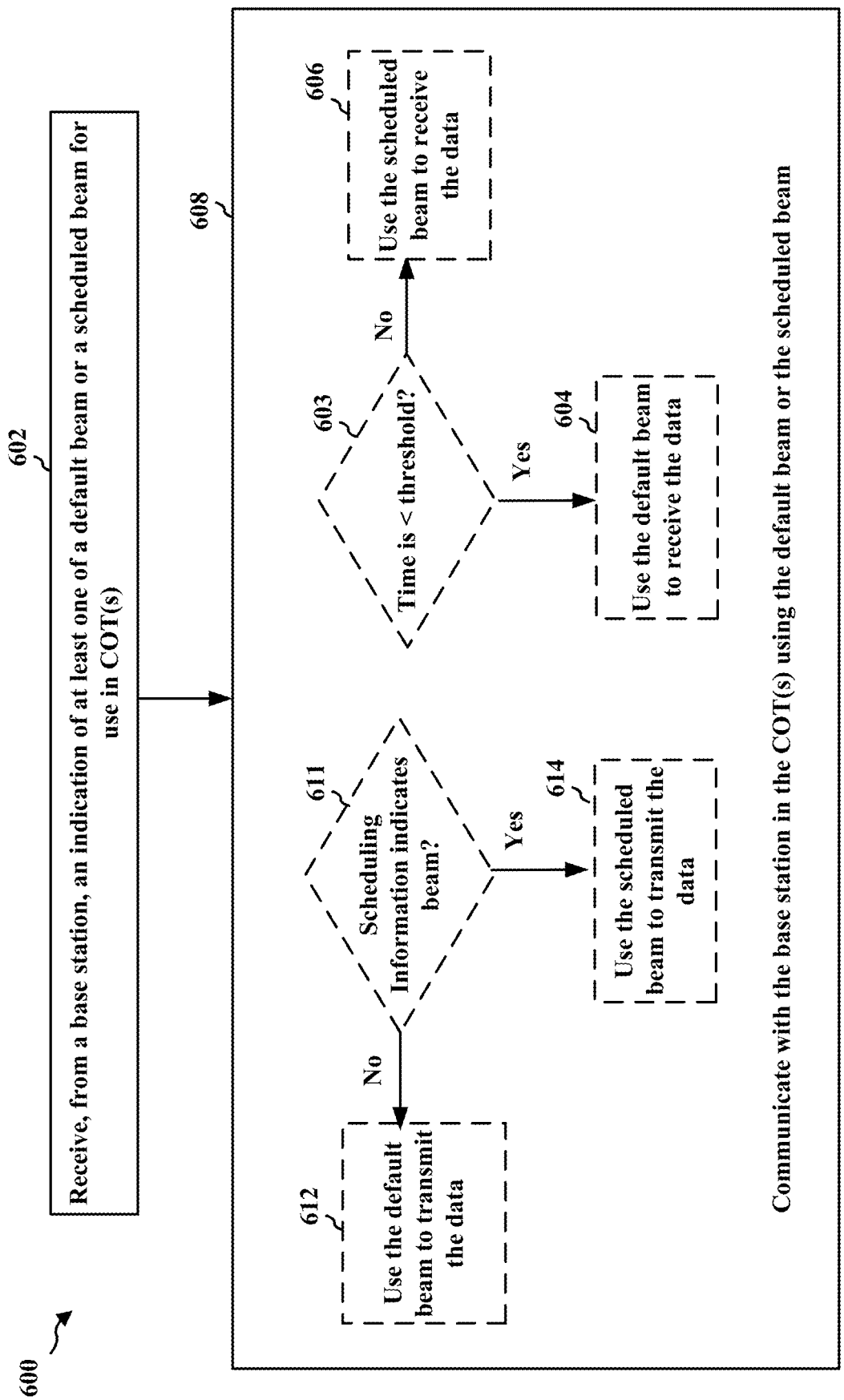
FIG. 6 is a flowchart of a method of wireless communication performed by a UE.

FIG. 6 is a flowchart 600 of a method of wireless communication. The method may be performed by a UE (e.g., UE 104, 350, 504, 1050, the apparatus 702/702', the processing system 814, which may include the memory 360 and which may be the entire UE 350 or a component of the UE 350, such as the TX processor 368, the RX processor 356, and/or the controller/processor 359) which receives communications from a base station (e.g., base station 102, 180, 310, 502, 750, the apparatus 1002, 1002'). Optional aspects are illustrated with a dashed line. The method improves the ability of the UE to communicate with a base station in the unlicensed frequency spectrum, by enabling the UE to more efficiently determine beams for communication with the base station.

Referring to FIG. 6, at 602, the UE receives from a base station, an indication of at least one of a default beam or a scheduled beam for use in at least one COT. For example, 602 may be performed by the indication component 712 in the apparatus 702 of FIG. 7. In one aspect, the default beam or the scheduled beam includes a reception beam, and the UE uses the default beam or the scheduled beam to receive data from the base station in the at least one COT. For example, as illustrated in FIG. 5, the base station may transmit an indication 506 or 514 of the default or scheduled reception (Rx) in a CORESET at the beginning of the COT. For example, referring to FIGS. 4B and 4C, the base station may indicate the Rx beam in CORESET-1 442, CORESET-2 444, or CORESET-3 446 during Slot 1 of the COT 402.

In one aspect, the default beam or the scheduled beam may be indicated by a transmission configuration indication (TCI) state. Referring to FIG. 5, the base station may indicate the default or scheduled Rx beam by transmitting a TCI state to the UE indicating the Rx beam to use. For example, the base station may transmit a CORESET including a TCI state indicating that the data transmission will be made using the same beam as the reference signal associated with the TCI.

In another aspect, the default beam or the scheduled beam may be indicated as being quasi co-located with another signal communicated between the base station and the UE. For example, referring to FIG. 5, the base station may indicate the default or scheduled Rx beam using a spatial QCL assumption. For instance, the base station may indicate for the UE to assume that the antenna port transmitting a SSB is spatially QCL with an antenna port transmitting a DM-RS in the PDSCH, and therefore that the data transmission will be made using the same beam as that used for the SSB.

At 608, the UE communicates with the base station in the at least one COT using the default beam or the scheduled beam. For example, 608 may be performed by the reception component 704 and the transmission component 706 in the apparatus 702 of FIG. 7.

For example, at 604, the UE uses the default beam to receive the data from the base station if an amount of time between the data and a downlink control signal scheduling the data is below a threshold, e.g., as determined at 603. Referring to FIG. 5, the base station transmits control information, including downlink control information (DCI) 508 to the UE, followed after an offset t 509 by the scheduled data 510 for that UE. If the amount of time t (the offset 509) for the UE to receive and decode the grant/PDCCH is less than the threshold T for that UE (i.e. the UE cannot decode the grant and switch to a scheduled Rx beam in time prior to receiving the data), the UE applies the default Rx beam. Thus, in the example of FIG. 4B, the offset $t_{UE-2}$ 432 between UE-2's grant 430 and scheduled data 434 is less than UE-2's threshold $T_{UE-2}$ 482, and therefore UE-2 might not be able switch to a scheduled Rx beam prior to receiving its scheduled data. Accordingly, UE-2 will apply a default Rx beam to receive its scheduled data.

At 606, the UE uses the scheduled beam to receive the data from the base station if an amount of time between the data and a downlink control signal scheduling the data is greater than or equal to a threshold, e.g., as determined at 603. The scheduled beam may be based on a CORESET in which the downlink control signal scheduling the data is received. For example, referring to FIG. 5, if the amount of time t (the offset 509) for the UE to receive and decode the grant/PDCCH is greater than or equal to the threshold T for that UE (i.e. the UE can decode the grant and switch to a scheduled Rx beam in time prior to receiving the data), the UE applies the scheduled Rx beam corresponding to the CORESET in which the DCI is transmitted. Thus, in the example of FIG. 4B, assuming CORESET-1 442 schedules UE-1's grant 424, the offset $t_{UE-1}$ 426 between UE-1's grant 424 and data 428 is greater than UE-1's threshold $T_{UE-1}$ 480, and therefore UE-1 can switch to the scheduled Rx beam prior to receiving its scheduled data. Accordingly, UE-1 will apply the scheduled Rx beam 443 corresponding to CORESET-1 442 to receive its scheduled data.

Thus, in the example of FIG. 4B, UE-1 may receive the scheduled data 428 from the base station in the at least one COT 402 using the scheduled Rx beam, and UE-2 may receive the scheduled data 434 from the base station in the at least one COT 402 using the default Rx beam.

In one aspect, the indication for the reception beam may indicate a common scheduled beam corresponding to a set of CORESETs. For example in FIGS. 4B and 4C, irrespective of whether CORESET-1 442, CORESET-2 444, or CORESET-3 446 defines the grant 424 which schedules data 428, UE-1 can use a common, scheduled Rx beam to receive data scheduled from any of those CORESETs.

In another aspect, the indication for the reception beam may indicate an individual scheduled beam for each of a plurality of CORESETs. The base station may indicate a scheduled Rx beam for each individual CORESET that can be used to receive data scheduled from that CORESET. For example, in the example of FIGS. 4B and 4C, UE-1 can decode a TCI state of CORESET-2 444 for an indicated scheduled Rx beam, which the UE can use to receive data scheduled by CORESET-2 444.

In a further aspect, the indication may indicate the default beam or the scheduled beam to be applied for a single COT, for more than one COT, or for a portion of a single COT (e.g. certain slots of a COT). For example, referring to FIGS. 4B and 4C, the base station can inform UE-1 to apply its indicated scheduled Rx beam identified from CORESET-2 444 for Slot 1 only, for the entire COT 402, or for multiple COTs.

In addition or alternative to communicating with the base station by receiving communication, the UE may use the indication of at least one of a default beam or a scheduled beam for use in at least one COT received at 602 in order to determine a transmission beam for transmitting communication to the base station. Thus, in one aspect, the default beam or the scheduled beam may include a transmission beam, and the UE may use the default beam or the scheduled beam to transmit uplink communication to the base station in the at least one COT. For example, as illustrated in FIG. 5, the base station may transmit an indication 506 or 514 of the default or scheduled Tx beam in a CORESET at the beginning of the COT. For example, referring to FIGS. 4B and 4C, the base station may indicate the Tx beam in CORESET-1 442, CORESET-2 444, or CORESET-3 446 during Slot 1 of the COT 402.

In one aspect, the default beam or the scheduled beam may be indicated based on a spatial relation dedicated to indicating the default or scheduled beam, or reusing an existing spatial relation indicating a beam for another uplink resource. For example, referring to FIG. 5, the base station may indicate in a CORESET for the UE to transmit data on PUSCH with the same Tx beam as that dedicated to a scheduled PUCCH resource based on a spatial relation between the PUSCH and PUCCH antenna ports.

In another aspect, the default beam or the scheduled beam may be based on a reception beam for the UE. Referring to FIG. 5, the base station may indicate the default or scheduled Rx beam using downlink/uplink correspondence. For example, the base station may indicate for the UE to transmit SRS using the same spatial filter used to receive a downlink reference signal such as SSB or CSI-RS.

At 612, the UE may use the default beam to transmit the uplink communication if scheduling information from the base station for the uplink communication does not indicate an uplink beam, e.g., as determined at 611. In one aspect, the scheduling information is carried by DCI in a PDCCH. Referring to FIG. 5, the base station transmits control information including DCI 516 to the UE, which identifies the uplink resources for the UE to use when transmitting data 518 to the base station. If the scheduling information does not contain an UL beam indication, the UE may apply the default Tx beam. For example, in FIG. 4B, the base station may schedule an UL signal for UE-2 in grant 430 using DCI format 0-0. As DCI format 0-0 may not include a SRI field, UE-2 may not know which UL beam to use for its scheduled data transmission. Accordingly, since the DCI for UE-2 does not include an UL beam indication, UE-2 may apply a default Tx beam for its uplink data transmission.

At 614, the UE may instead use the scheduled beam to transmit the uplink communication if scheduling information from the base station for the uplink communication indicates for the UE to use the indicated scheduled beam, e.g., as determined at 611. In one aspect, the scheduling information for the uplink communication may be carried by DCI, a Medium Access Control-Control Element (MAC-CE), or a RRC message. For example, referring to FIG. 5, if the scheduling information carried by DCI 516 contains an UL beam indication, the UE 504 may apply the scheduled Tx beam.

Thus, the UE may communicate with the base station, at 608, in the at least one COT using the default beam or the scheduled beam. For example, in the example of FIG. 4B, UE-1 may transmit data scheduled by grant 424 to the base station in the at least one COT 402 using the scheduled Tx beam, and UE-2 may transmit data scheduled by grant 430 to the base station in the at least one COT 402 using the default Tx beam.

In one aspect, the indication for the transmission beam may indicate a common scheduled beam corresponding to a set of CORESETs. For example, if the scheduling information does not include an uplink beam indication informing the UE which UL beam to use, the base station can indicate a common scheduled Tx beam for the UE to use for UL transmission that is configured for all CORESETs. Thus, in the example of FIGS. 4B and 4C, if the grant 430 for UE-2 does not include an UL beam indication, the base station can indicate a common scheduled Tx beam for UE-2 to use for any of CORESET-1 442, CORESET-2 444, or CORESET-3 446.

In another aspect, the indication for the reception beam indicates an individual scheduled beam for each of a plurality of CORESETs. The base station may indicate a scheduled Tx beam per individual CORESET that can be used to transmit data scheduled from that CORESET. The scheduled Tx beam may also correspond to the same Rx beam for a corresponding CORESET. For example, in the example of FIG. 4C, if CORESET-1 442 schedules data for UE-1, the UE-1 can use the indicated scheduled Tx beam to transmit data scheduled by CORESET-1 442. The UE-1 may also use the same Tx beam as the Rx beam corresponding to CORESET-1 442.

In a further aspect, the indication may indicate the default beam or the scheduled beam to be applied for a single COT, for more than one COT, or for a portion of a single COT (e.g. certain slots of a COT). For example, referring to FIGS. 4B and 4C, the base station can inform UE-1 to apply its indicated scheduled Tx beam identified from CORESET-1 442 for Slot 1 only, for the entire COT, or for multiple COTs.

Figure 7:
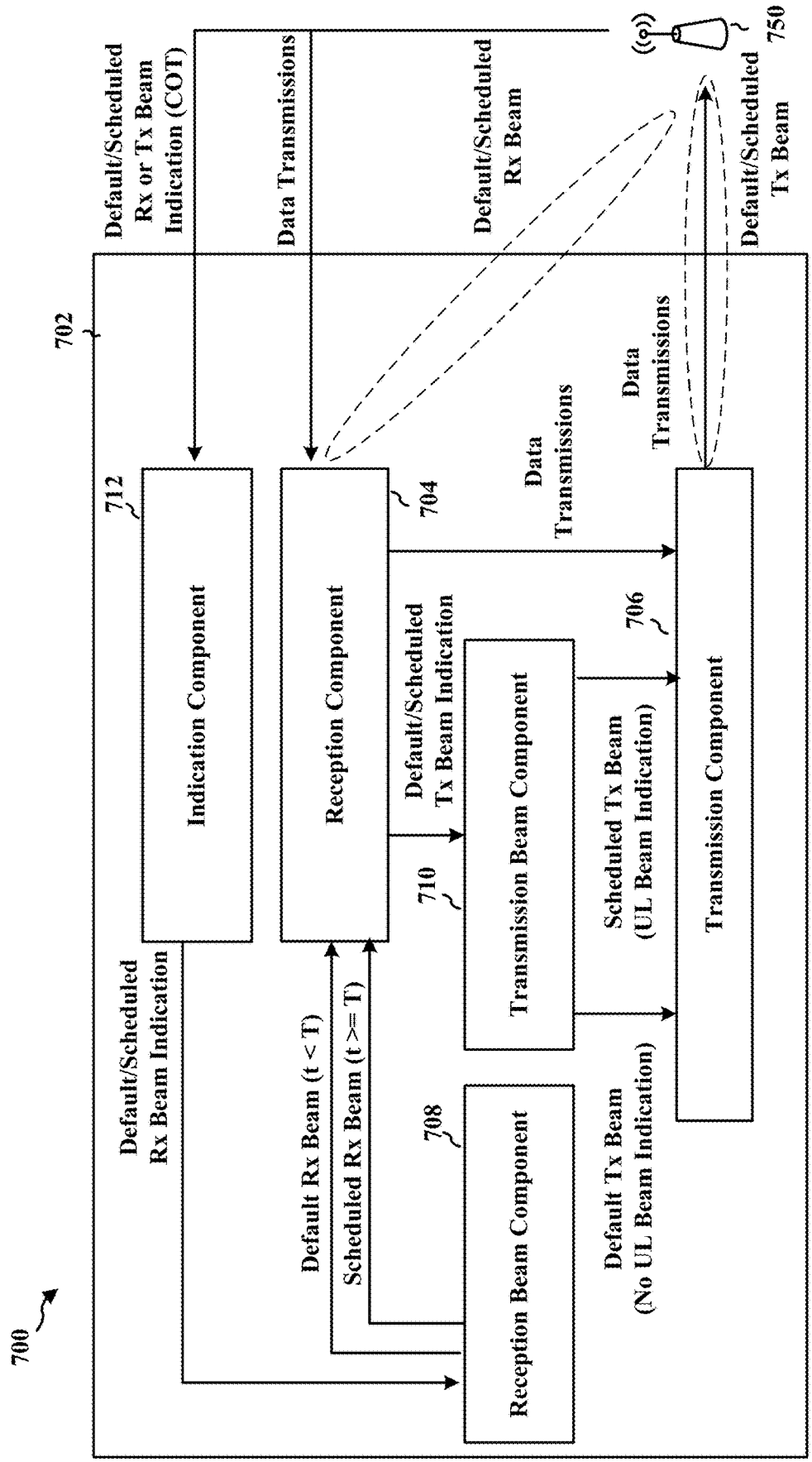
FIG. 7 is a conceptual data flow diagram illustrating the data flow between different means/components in an example UE apparatus.

FIG. 7 is a conceptual data flow diagram 700 illustrating the data flow between different means/components in an example apparatus 702. The apparatus may be a UE or a component of a UE (e.g., UE 102, 350, 504, 1050). The apparatus 702 includes a reception component 704 that receives downlink communication from a base station 750. The apparatus includes an indication component 712, that is configured to receive, from the base station 750, an indication of at least one of a default Rx or Tx beam or a scheduled Rx or Tx beam for use in at least one COT and data transmissions (e.g. scheduling grants and data), e.g., as described in connection with 602 of FIG. 6. The apparatus also includes a transmission component 706 that transmits uplink communications to the base station. The apparatus further includes a reception beam component 708 that determines whether to use the default Rx beam to receive the data from the base station if an amount of time t between the data and a downlink control signal scheduling the data is below a threshold T, e.g., as described in connection with 604 of FIG. 6, or that uses the scheduled Rx beam to receive the data from the base station if an amount of time t between the data and a downlink control signal scheduling the data is greater than or equal to the threshold T, e.g., as described in connection with 606 of FIG. 6. The apparatus additionally includes a transmission beam component 710 that determines whether to use the default Tx beam to transmit the uplink communication if scheduling information from the base station for the uplink communication does not indicate an uplink beam, e.g., as described in connection with 612 of FIG. 6, or that uses the scheduled Tx beam to transmit the uplink communication if scheduling information from the base station for the uplink communication indicates for the UE to use the indicated scheduled beam, e.g., as described in connection with 614 of FIG. 6. The reception component 704 and transmission component 706 together communicate with the base station in the at least one COT using the default Rx or Tx beam or the scheduled Rx or Tx beam, e.g., as described in connection with 608 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
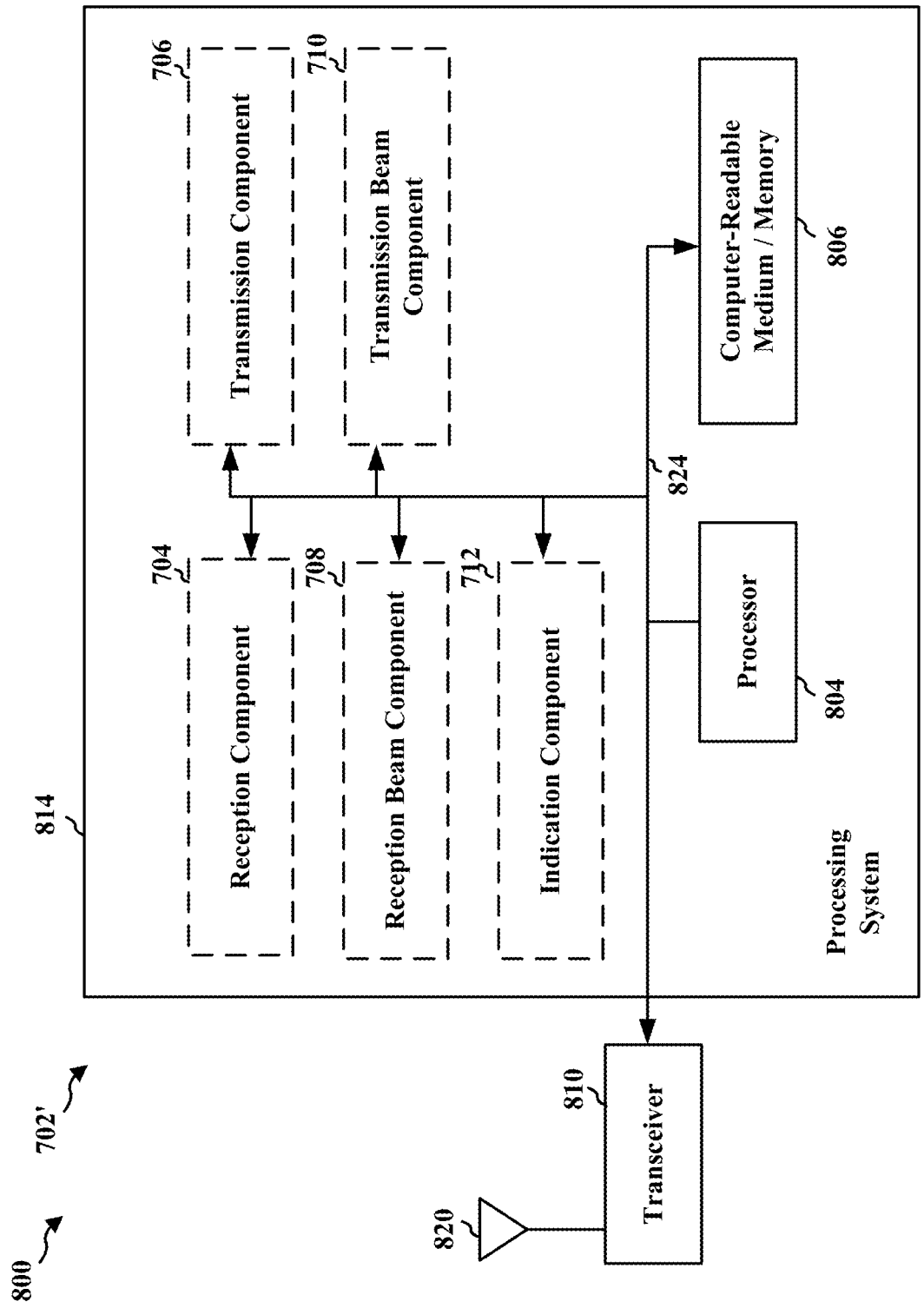
FIG. 8 is a diagram illustrating an example of a hardware implementation for a UE apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the reception component 704, transmission component 706, reception beam component 708, transmission beam component 710, indication component 712, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for receiving, from a base station, an indication of at least one of a default beam or a scheduled beam for use in at least one COT; and means for communicating with the base station in the at least one COT using the default beam or the scheduled beam. In one aspect, the default beam or the scheduled beam may include a reception beam, and the UE may use the default beam or the scheduled beam to receive data from the base station in the at least one COT. In another aspect, the default beam or the scheduled beam may include a transmission beam, and the UE may use the default beam or the scheduled beam to transmit uplink communication to the base station in the at least one COT.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
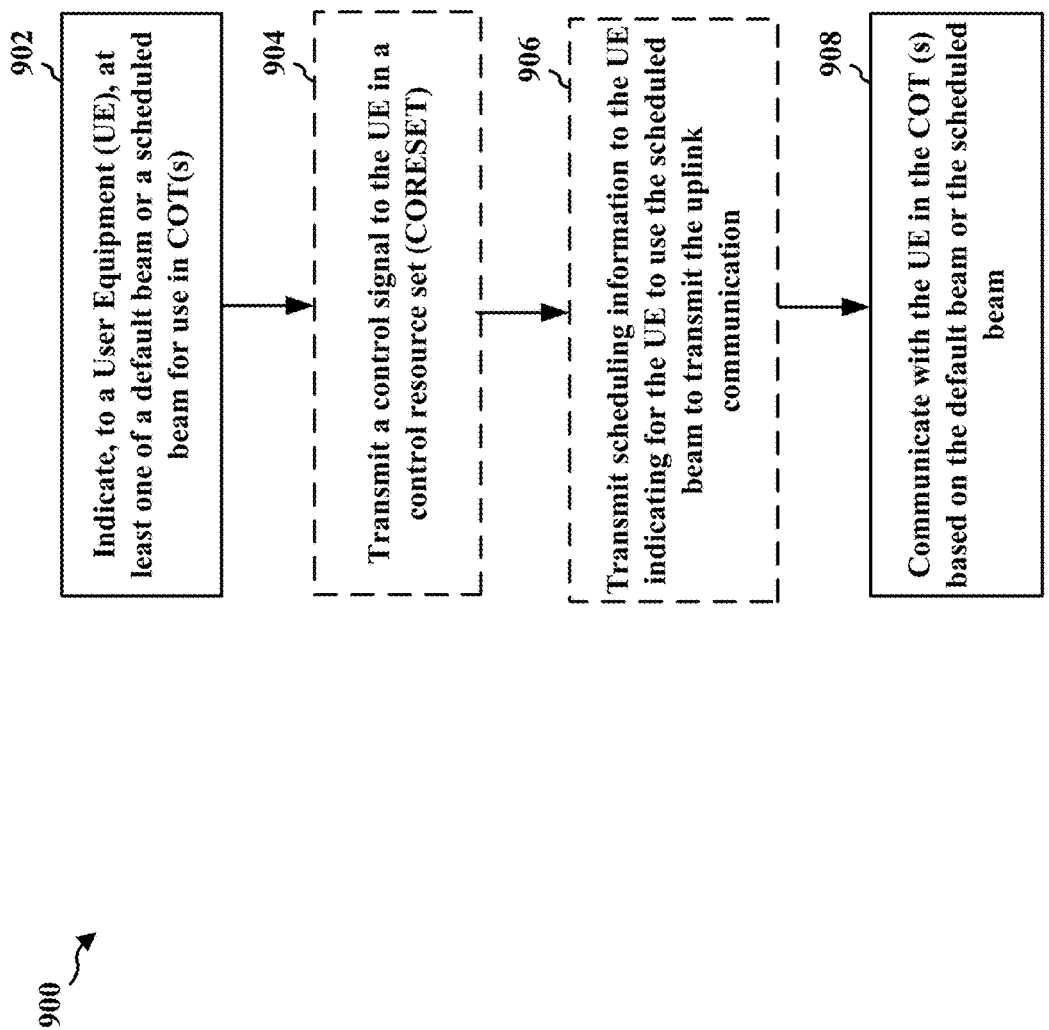
FIG. 9 is a flowchart of a method of wireless communication performed by a base station.

FIG. 9 is a flowchart 900 of a method of wireless communication. The method may be performed by a base station (e.g., base station 102, 180, 310, 502, 750, the apparatus 1002/1002', the processing system 1114, which may include the memory 376 and which may be the entire base station 310 or a component of the base station 310, such as the TX processor 316, the RX processor 370, and/or the controller/processor 375) which transmits communications to and receives communications from a UE (e.g., UE 104, 350, 504, 1050, the apparatus 702, 702'). FIG. 9 shows the situation where the base station transmits an indicated reception beam for the UE to receive downlink communications from the base station. FIG. 9 also shows the situation where the base station transmits an indicated transmission beam for the UE to transmit uplink communications to the base station. Optional aspects are illustrated with a dashed line. The method improves the ability of the UE to communicate with a base station in the unlicensed frequency spectrum, by enabling the UE to more efficiently determine beams for communication with the base station.

At 902, the base station indicates, to a UE, at least one of a default beam or a scheduled beam for use in at least one COT. For example, 902 may be performed by the reception beam indication component 1004 and the transmission beam indication component 1006 of the apparatus 1002 in FIG. 10. In one aspect, the default beam or the scheduled beam may include a reception beam, and the base station transmits data to the UE for reception using the default beam or the scheduled beam. For example, as illustrated in FIG. 5, the base station may transmit an indication 506 or 514 of the default or scheduled reception (Rx) in a CORESET at the beginning of the COT. For example, referring to FIGS. 4B and 4C, the base station may indicate the Rx beam in CORESET-1 442, CORESET-2 444, or CORESET-3 446 during Slot 1 of the COT 402.

In one aspect, the default beam or the scheduled beam may be indicated by a TCI state. Referring to FIG. 5, the base station may indicate the default or scheduled Rx beam by transmitting a TCI state to the UE indicating the Rx beam to use. For example, the base station may transmit a CORESET including a TCI state indicating that the data transmission will be made using the same beam as the reference signal associated with the TCI.

In another aspect, the default beam or the scheduled beam may be indicated as being spatially quasi co-located with another signal communicated between the base station and the UE. For example, referring to FIG. 5, the base station may indicate the default or scheduled Rx beam using a spatial QCL assumption. For instance, the base station may indicate for the UE to assume that the antenna port transmitting a SSB is spatially QCL with an antenna port transmitting a DM-RS in the PDSCH, and therefore that the data transmission will be made using the same beam as that used for the SSB.

At 904, the base station may transmit a control signal to the UE in a CORESET, where the scheduled beam is based on the CORESET in which the downlink control signal scheduling the data is transmitted. For example, 904 may be performed by the control signal component 1012 of the apparatus 1002 in FIG. 10. For example, referring to FIG. 5, the base station transmits control information, including DCI 508 to the UE, followed after an offset t 509 by the scheduled data 510 for that UE. If the amount of time t (the offset 509) for the UE to receive and decode the grant/PDCCH is greater than or equal to the threshold T for that UE (i.e. the UE can decode the grant and switch to a scheduled Rx beam in time prior to receiving the data), the UE applies the scheduled Rx beam corresponding to the CORESET in which the DCI is transmitted. Otherwise, the UE applies the default Rx beam. Thus, in the example of FIGS. 4B and 4C, assuming CORESET-1 442 schedules UE-1's grant 424, the offset $t_{UE-1}$ 426 between UE-1's grant 424 and data 428 is greater than UE-1's threshold $T_{UE-1}$ 480, and therefore UE-1 can switch to the scheduled Rx beam prior to receiving its scheduled data. Accordingly, UE-1 will apply the scheduled Rx beam 443 corresponding to CORESET-1 442 to receive its scheduled data. However, since the offset $t_{UE-2}$ 432 between UE-2's grant 430 and scheduled data 434 is less than UE-2's threshold $T_{UE-2}$ 482, UE-2 cannot switch to the scheduled Rx beam prior to receiving its scheduled data. Therefore, UE-2 will apply a default Rx beam to receive its scheduled data.

At 908, the base station communicates with the UE in the at least one COT based on the default beam or the scheduled beam. For example, 908 may be performed by the reception component 1008 and the transmission component 1010 of the apparatus 1002 in FIG. 10. For example, in the example of FIG. 4B, the base station will indicate for UE-1 to receive its scheduled data 428 from the base station in the at least one COT 402 using the scheduled Rx beam, and the base station will indicate for UE-2 to receive its scheduled data 434 from the base station in the at least one COT 402 using the default Rx beam.

In one aspect, the indication for the reception beam may indicate a common scheduled beam corresponding to a set of CORESETs. For example in FIGS. 4B and 4C, irrespective of whether CORESET-1 442, CORESET-2 444, or CORESET-3 446 defines the grant 424 which schedules data 428, UE-1 can use a common, scheduled Rx beam to receive data scheduled from any of those CORESETs.

In another aspect, the indication for the reception beam may indicate an individual scheduled beam for each of a plurality of CORESETs. The base station may indicate a scheduled Rx beam for each individual CORESET that can be used to receive data scheduled from that CORESET. For example, in the example of FIGS. 4B and 4C, UE-1 can decode a TCI state of CORESET-2 444 for an indicated scheduled Rx beam, which the UE can use to receive data scheduled by CORESET-2 444.

In a further aspect, the indication may indicate the default beam or the scheduled beam to be applied for a single COT, for more than one COT, or for a portion of a single COT (e.g. certain slots of a COT). For example, referring to FIGS. 4B and 4C, the base station can inform UE-1 to apply its indicated scheduled Rx beam identified from CORESET-2 444 for Slot 1 only, for the entire COT 402, or for multiple COTs.

In one aspect, the default beam or the scheduled beam indicated to the UE at 902 may include a transmission beam, and the base station receives uplink communication from the UE based on the default beam or the scheduled beam in the at least one COT. For example, as illustrated in FIG. 5, the base station may transmit an indication 506 or 514 of the default or scheduled Tx beam in a CORESET at the beginning of the COT. For example, referring to FIGS. 4B and 4C, the base station may indicate the Tx beam in CORESET-1 442, CORESET-2 444, or CORESET-3 446 during Slot 1 of the COT 402.

In one aspect, the default beam or the scheduled beam may be indicated based on a spatial relation dedicated to indicating the default or scheduled beam, or reusing an existing spatial relation indicating a beam for another uplink resource. For example, referring to FIG. 5, the base station may indicate in a CORESET for the UE to transmit data on PUSCH with the same Tx beam as that dedicated to a scheduled PUCCH resource based on a spatial relation between the PUSCH and PUCCH antenna ports.

In another aspect, the default beam or the scheduled beam may be based on a reception beam for the UE. Referring to FIG. 5, the base station may indicate the default or scheduled Rx beam using downlink/uplink correspondence. For example, the base station may indicate for the UE to transmit SRS using the same spatial filter used to receive a downlink reference signal such as SSB or CSI-RS.

At 906, the base station transmits scheduling information to the UE indicating for the UE to use the scheduled beam to transmit the uplink communication. For example, 906 may be performed by the scheduling information component 1014 of the apparatus 1002 in FIG. 10. In one aspect, the scheduling information is carried in downlink control information, a MAC-CE, or an RRC message. For example, referring to FIG. 5, the base station transmits control information including DCI 516 to the UE, which identifies the uplink resources for the UE to use when transmitting data 518 to the base station. If the scheduling information carried by DCI 516 contains an UL beam indication, the UE 504 applies the scheduled Tx beam. Otherwise, the UE applies the default Tx beam. For example, in FIG. 4B, the base station may schedule an UL signal for UE-2 in grant 430 using DCI format 0-0. As DCI format 0-0 may not include an SRI field, UE-2 may not know which UL beam to use for its scheduled data transmission. Accordingly, since the DCI for UE-2 does not include an UL beam indication, UE-2 will apply a default Tx beam for its uplink data transmission.

Thus, at 908, the base station may communicate with the UE in the at least one COT based on the default Tx beam or the Tx scheduled beam, e.g., receiving communication from the UE that has been transmitted using the indicated Tx beam. For example, in the example of FIG. 4B, UE-1 may transmit data scheduled by grant 424 to the base station in the at least one COT 402 using the scheduled Tx beam, and UE-2 may transmit data scheduled by grant 430 to the base station in the at least one COT 402 using the default Tx beam.

In one aspect, the indication for the transmission beam may indicate a common scheduled beam corresponding to a set of CORESETs. For example, if the scheduling information does not include an uplink beam indication informing the UE which UL beam to use, the base station can indicate a common scheduled Tx beam for the UE to use for UL transmission that is configured for all CORESETs. Thus, in the example of FIGS. 4B and 4C, if the grant 430 for UE-2 does not include an UL beam indication, the base station can indicate a common scheduled Tx beam for UE-2 to use for any of CORESET-1 442, CORESET-2 444, or CORESET-3 446.

In another aspect, the indication for the reception beam indicates an individual scheduled beam for each of a plurality of CORESETs. The base station may indicate a scheduled Tx beam per individual CORESET that can be used to transmit data scheduled from that CORESET. The scheduled Tx beam may also correspond to the same Rx beam for a corresponding CORESET. For example, in the example of FIG. 4C, if CORESET-1 442 schedules data for UE-1, the UE-1 can use the indicated scheduled Tx beam to transmit data scheduled by CORESET-1 442. The UE-1 may also use the same Tx beam as the Rx beam corresponding to CORESET-1 442.

In a further aspect, the indication may indicate the default beam or the scheduled beam to be applied for a single COT, for more than one COT, or for a portion of a single COT (e.g. certain slots of a COT). For example, referring to FIGS. 4B and 4C, the base station can inform UE-1 to apply its indicated scheduled Tx beam identified from CORESET-1 442 for Slot 1 only, for the entire COT, or for multiple COTs.

Figure 10:
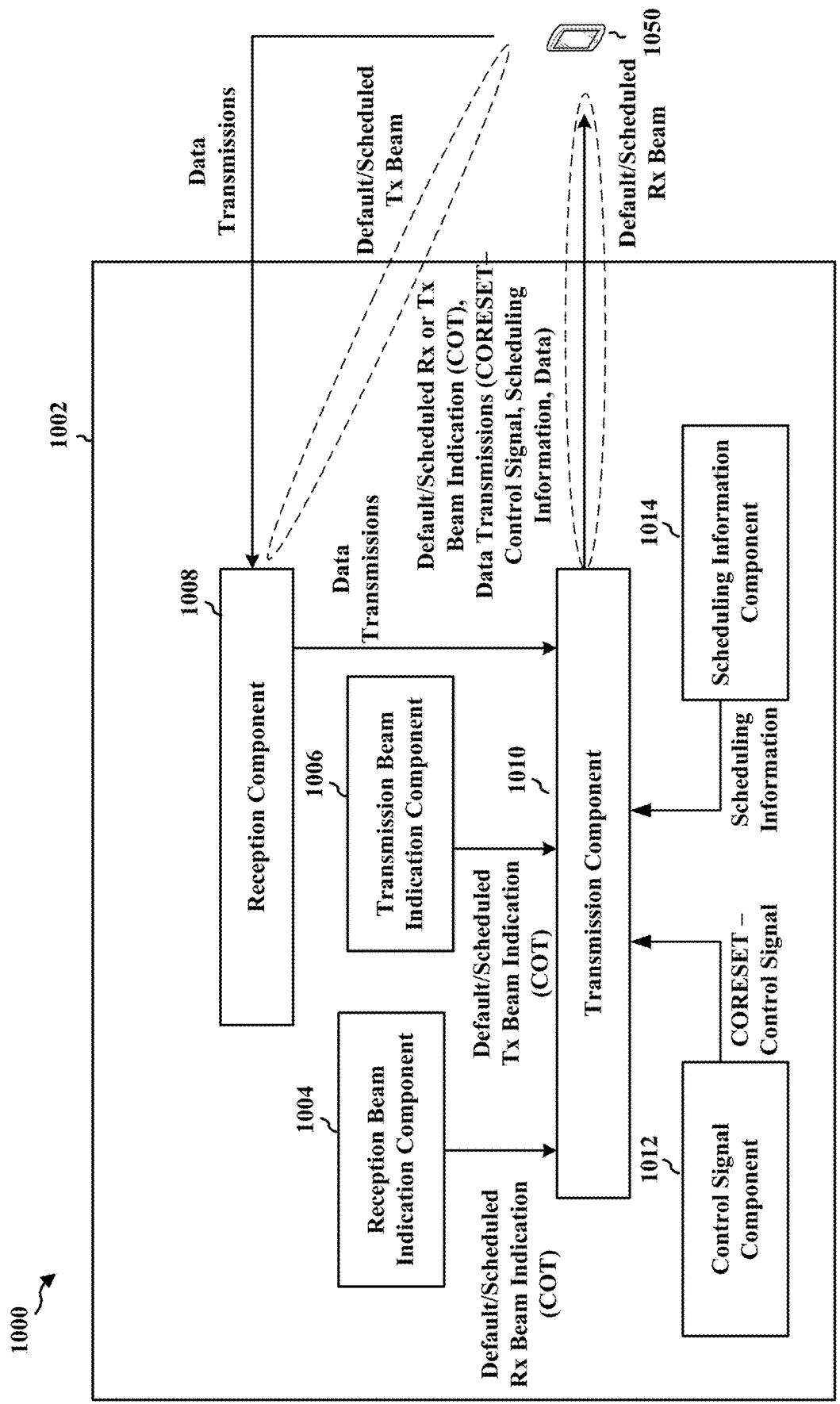
FIG. 10 is a conceptual data flow diagram illustrating the data flow between different means/components in an example base station apparatus.

FIG. 10 is a conceptual data flow diagram 1000 illustrating the data flow between different means/components in an example apparatus 1002. The apparatus may be a base station or a component of a base station (e.g. base station 102/180, 310, 502, 750). The apparatus includes a reception beam indication component 1004 that indicates, to a UE 1050, at least one of a default Rx beam or a scheduled Rx beam for use in at least one COT, e.g., as described in connection with 902 of FIG. 9. The apparatus also includes a transmission beam indication component 1006 that indicates, to a UE, at least one of a default Tx beam or a scheduled Tx beam for use in at least one COT, e.g., as also described in connection with 902 of FIG. 9. The apparatus further includes a reception component 1008 that receives uplink data transmissions from a UE, and a transmission component 1010 that transmits downlink communications or data to the UE including the default/scheduled Rx or Tx beam indication. For Rx beams, a control signal component 1012 transmits a control signal to the UE in a CORESET, e.g., as described in connection with 904 of FIG. 9. For Tx beams, a scheduling information component 1014 transmits scheduling information to the UE indicating for the UE to use the scheduled beam to transmit the uplink communication, e.g., as described in connection with 906 of FIG. 9. The reception component 1008 and transmission component 1010 together communicate with the UE in the at least one COT based on the default Rx or Tx beam or the scheduled Rx or Tx beam, e.g., as described in connection with 908 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
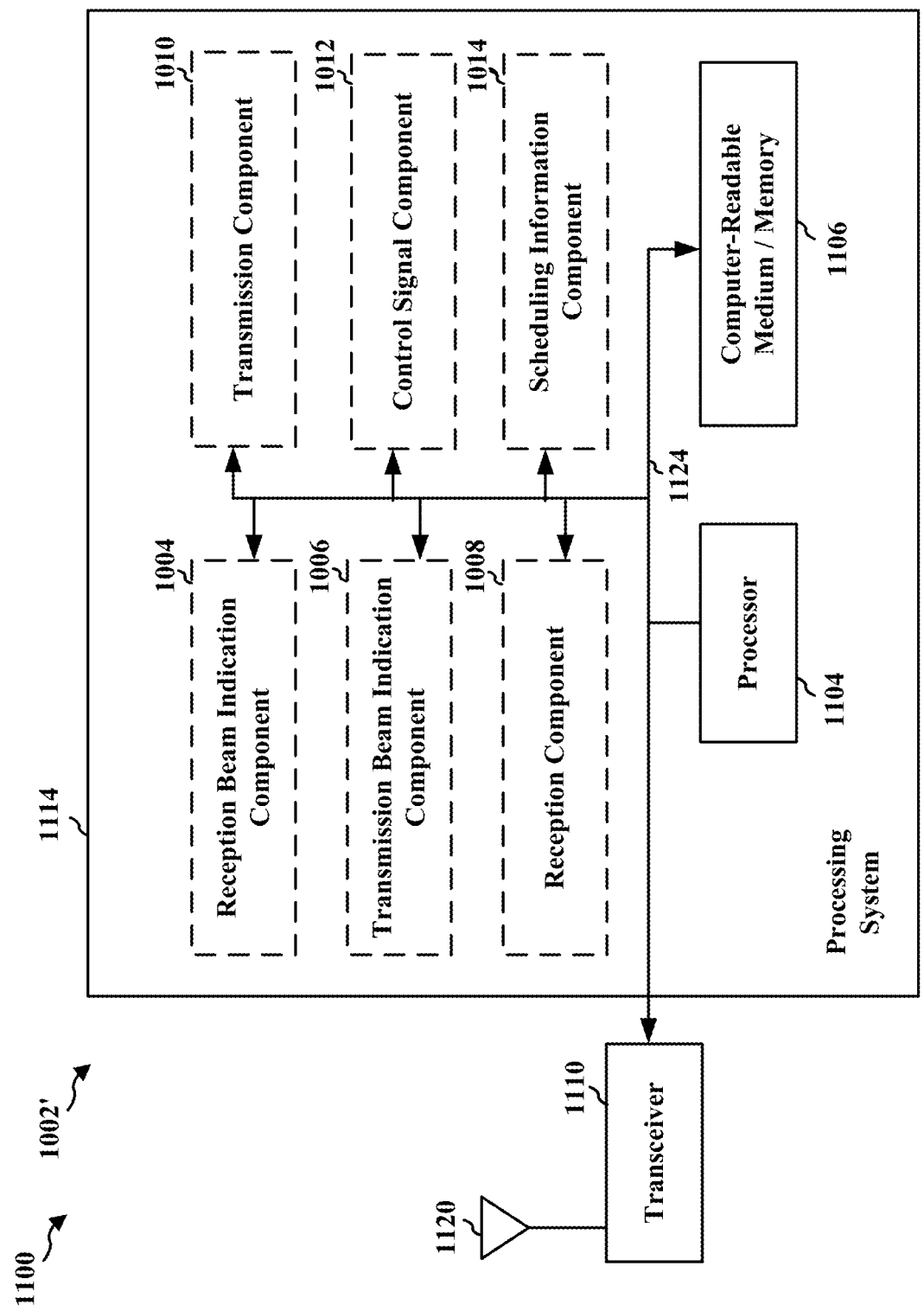
FIG. 11 is a diagram illustrating an example of a hardware implementation for a base station apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the reception beam indication component 1004, the transmission beam indication component 1006, the reception component 1008, the transmission component 1010, the control signal component 1012, the scheduling information component 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1008. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for indicating, to a User Equipment (UE), at least one of a default beam or a scheduled beam for use in at least one Channel Occupancy Time (COT); and means for communicating with the UE in the at least one COT based on the default beam or the scheduled beam. In one aspect, the default beam or the scheduled beam may include a reception beam, and the apparatus 1002/1002' may be configured to transmit data to the UE for reception using the default beam or the scheduled beam. In another aspect, the default beam or the scheduled beam may include a transmission beam, and the apparatus 1002/1002' may be configured to receive uplink communication from the UE based on the default beam or the scheduled beam in the at least one COT. The apparatus 1002/1002' may further include means for transmitting scheduling information to the UE indicating for the UE to use the scheduled beam to transmit the uplink communication, where the scheduling information is carried in downlink control information, a MAC-CE, or an RRC message.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

As a result, the present disclosure improves beamforming in high, unlicensed frequency bands (e.g. 60 GHz), where data can only be transmitted within a COT, by providing for improved signaling of default and scheduled beams in the COT. In particular, the base station directly indicates a default or scheduled Rx or Tx beam in the COT. The Rx beam allows the base station to communicate downlink with the UE using the default or scheduled beam, and the Tx beam allows the UE to communicate uplink with the base station in the COT using the default or scheduled beam. The base station may transmit an indication of the default or scheduled beam in a CORESET at the beginning of the COT. As a result, the base station allows the UE to identify its default or scheduled Rx or Tx beam for its scheduled data at earliest at the beginning of the COT, without having to derive the beam from the QCL of the lowest CORESET ID in a dynamically indicated DCI of the latest monitored slot. The UE can thus more rapidly realize the default or scheduled Rx and/or Tx beam and subsequently communicate with the base station in one or more COTs (or a portion of a COT) using the default or scheduled Rx or Tx beam.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE) comprising:
  receiving, from a base station at a beginning of at least one Channel Occupancy Time (COT), an indication of the at least one COT associated with an unlicensed frequency spectrum;
  transmitting or receiving communication with the base station on the unlicensed frequency spectrum in the at least one COT using a default beam or a scheduled beam, wherein the default beam or the scheduled beam comprises a reception beam, and wherein the UE uses the default beam or the scheduled beam to receive data from the base station in the at least one COT; receiving a downlink control signal scheduling the data; and
  receiving the data from the base station using a beam, the beam being the default beam indicated for the at least one COT if an amount of time between the data and the downlink control signal scheduling the data is less than a threshold and being the scheduled beam if the amount of time between the data and the downlink control signal scheduling the data is greater than or equal to the threshold.

2. The method of claim 1, wherein the indication indicates at least one of:
a common scheduled beam corresponding to a set of control resource sets (CORESETs);
an individual scheduled beam for each of a plurality of CORESETs;
the default beam or the scheduled beam to be applied for a single COT;
the default beam or the scheduled beam to be applied for more than one COT; or
the default beam or the scheduled beam to be applied for a portion of the single COT.

3. The method of claim 1, wherein the default beam or the scheduled beam is indicated by a transmission configuration indication state.

4. The method of claim 1, wherein the default beam or the scheduled beam is indicated as being quasi co-located with another signal communicated between the base station and the UE.

5. The method of claim 1, wherein the UE uses the default beam indicated for the at least one COT to receive the data from the base station based on the amount of time between the data and the downlink control signal scheduling the data being below the threshold.

6. The method of claim 1, wherein the scheduled beam is based on a control resource set (CORESET) in which the downlink control signal scheduling the data is received.

7. A method of wireless communication at a User Equipment (UE) comprising:
receiving, from a base station at a beginning of at least one Channel Occupancy Time (COT), an indication of the at least one COT associated with an unlicensed frequency spectrum;
transmitting or receiving communication with the base station on the unlicensed frequency spectrum in the at least one COT using a default beam or a scheduled beam, wherein the default beam or the scheduled beam comprises a transmission beam, and wherein the UE uses the default beam or the scheduled beam to transmit uplink communication to the base station in the at least one COT; and
receiving a downlink control signal scheduling data, wherein the UE uses the default beam to transmit the uplink communication if scheduling information from the base station for the uplink communication does not indicate an uplink beam; and wherein the scheduling information is carried by Downlink Control Information (DCI) in a Physical Downlink Control Channel (PDCCH).

8. The method of claim 7, wherein the default beam or the scheduled beam is indicated based on a reception beam for the UE, a spatial relation dedicated to indicating the default beam or the scheduled beam, or reusing an existing spatial relation indicating a beam for another uplink resource.

9. The method of claim 7, wherein the UE uses the scheduled beam to transmit the uplink communication if the scheduling information from the base station for the uplink communication indicates for the UE to use the scheduled beam.

10. The method of claim 7, wherein the indication indicates at least one of:
a common scheduled beam corresponding to a set of control resource sets (CORESETs);
an individual scheduled beam for each of a plurality of CORESETs;
the default beam or the scheduled beam to be applied for a single COT;
the default beam or the scheduled beam to be applied for more than one COT; or
the default beam or the scheduled beam to be applied for a portion of the single COT.

11. An apparatus for wireless communication at a User Equipment (UE), comprising:
a memory; and
at least one processor coupled to the memory and configured to:
receive, from a base station at a beginning of at least one Channel Occupancy Time (COT), an indication of a default beam for use in the at least one COT associated with an unlicensed frequency spectrum;
transmit or receive communication with the base station on the unlicensed frequency spectrum in the at least one COT using the default beam or a scheduled beam;
receive downlink control signal scheduling data; and
use the default beam indicated for the COT to receive the data from the base station if an amount of time between the data and the downlink control signal scheduling the data is below a threshold or use the scheduled beam to receive the data from the base station if the amount of time between the data and the downlink control signal scheduling the data is greater than or equal to the threshold.

12. The apparatus of claim 11, wherein the default beam or the scheduled beam comprises a reception beam, and wherein the UE uses the default beam or the scheduled beam to receive data from the base station in the at least one COT.

13. The apparatus of claim 11, wherein the default beam or the scheduled beam comprises a transmission beam, and wherein the UE uses the default beam or the scheduled beam to transmit uplink communication to the base station in the at least one COT.

14. An apparatus for wireless communication at a User Equipment (UE), comprising:
a memory; and
at least one processor coupled to the memory and configured to:
receive, from a base station at a beginning of at least one Channel Occupancy Time (COT), an indication of the at least one COT associated with an unlicensed frequency spectrum;
transmit or receive communication with the base station on the unlicensed frequency spectrum in the at least one COT using a default beam or a scheduled beam, wherein the default beam or the scheduled beam comprises a transmission beam, and wherein the UE uses the default beam or the scheduled beam to transmit uplink communication to the base station in the at least one COT; and
receive a downlink control signal scheduling data, wherein the UE uses the default beam to transmit the uplink communication if scheduling information from the base station for the uplink communication does not indicate an uplink beam; and wherein the scheduling information is carried by Downlink Control Information (DCI) in a Physical Downlink Control Channel (PDCCH).

15. The apparatus of claim 14, wherein the default beam or the scheduled beam is indicated based on a reception beam for the UE, a spatial relation dedicated to indicating the default beam or the scheduled beam, or reusing an existing spatial relation indicating a beam for another uplink resource.

16. The apparatus of claim 14, wherein the at least one processor is further configured to:
   use the scheduled beam to transmit the uplink communication if the scheduling information from the base station for the uplink communication indicates for the UE to use the scheduled beam.

17. The apparatus of claim 14, wherein the indication indicates at least one of:
   a common scheduled beam corresponding to a set of control resource sets (CORESETs);
   an individual scheduled beam for each of a plurality of CORESETs;
   the default beam or the scheduled beam to be applied for a single COT;
   the default beam or the scheduled beam to be applied for more than one COT; or
   the default beam or the scheduled beam to be applied for a portion of the single COT.

18. The apparatus of claim 11, wherein the scheduled beam is based on a control resource set (CORESET) in which the downlink control signal scheduling the data is received.

* * * * *